March 30, 1948. E. V. CHRISTENSEN 2,438,842
AUTOMATIC DIMPLER
Filed March 7, 1944 3 Sheets-Sheet 1
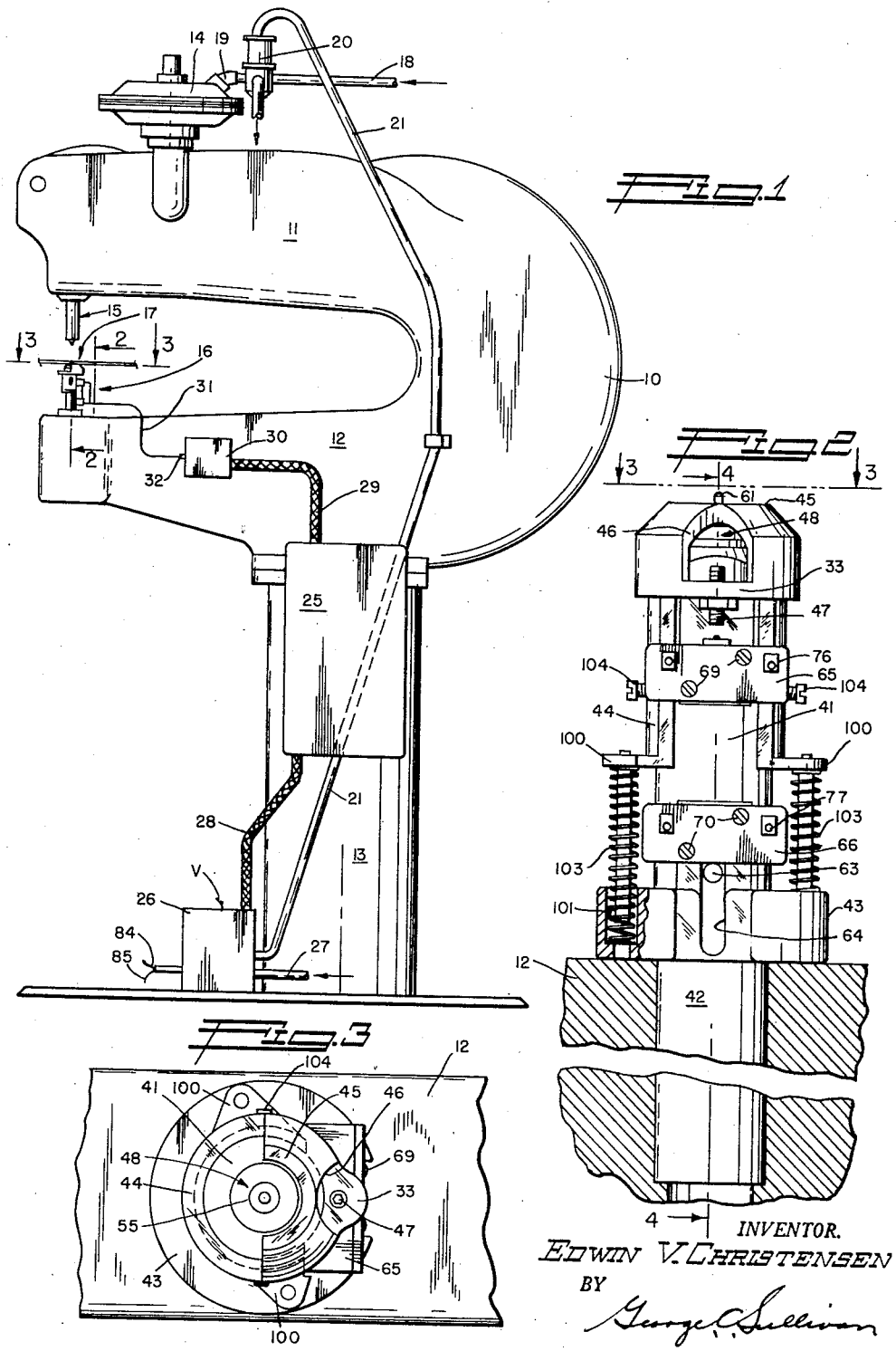
INVENTOR.
EDWIN V. CHRISTENSEN
BY
George C. Sullivan
AGENT March 30, 1948. E. V. CHRISTENSEN 2,438,842
AUTOMATIC DIMPLER
Filed March 7, 1944 3 Sheets-Sheet 2
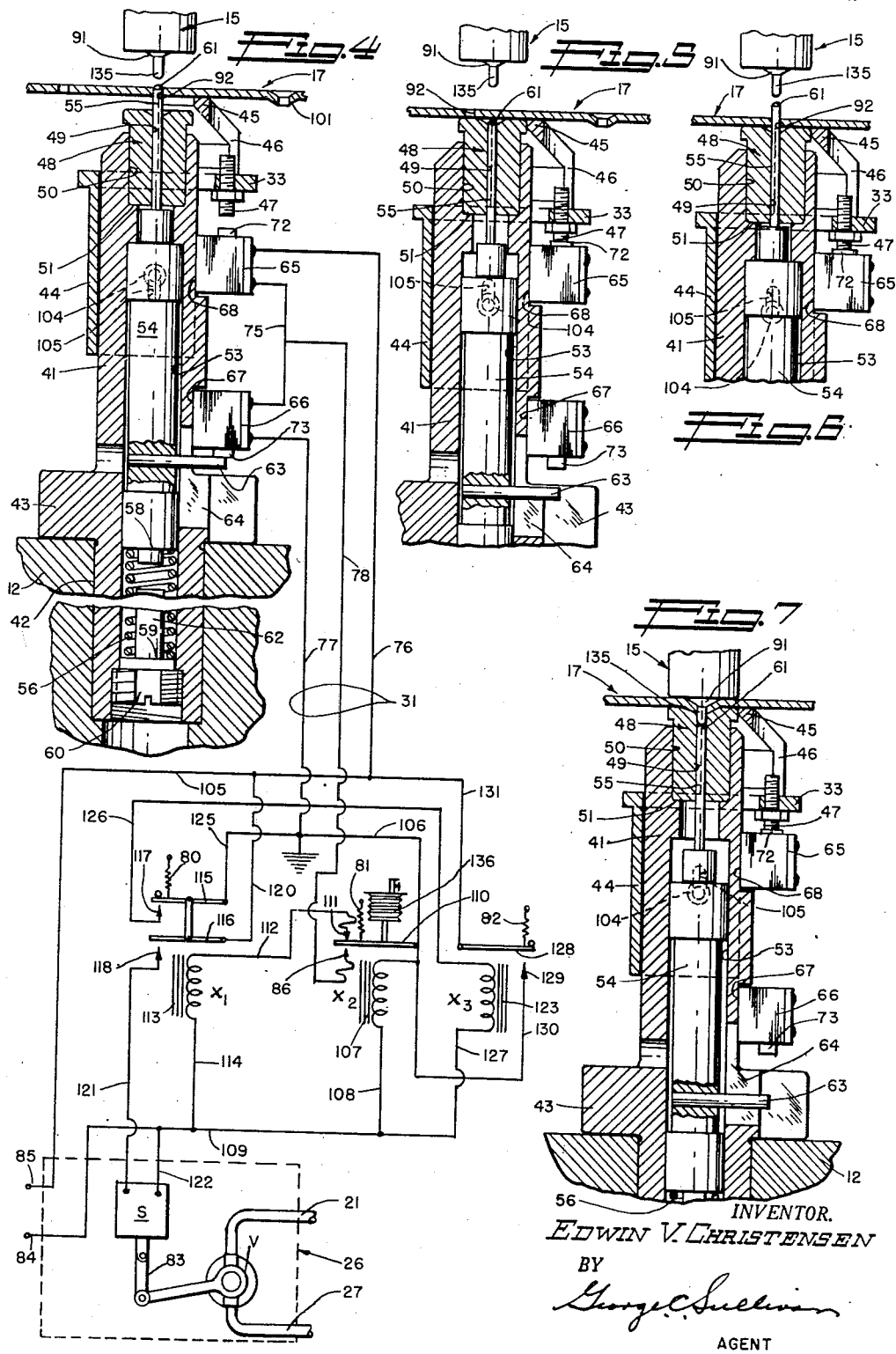
INVENTOR.
EDWIN V. CHRISTENSEN
BY
George C. Sullivan
AGENT

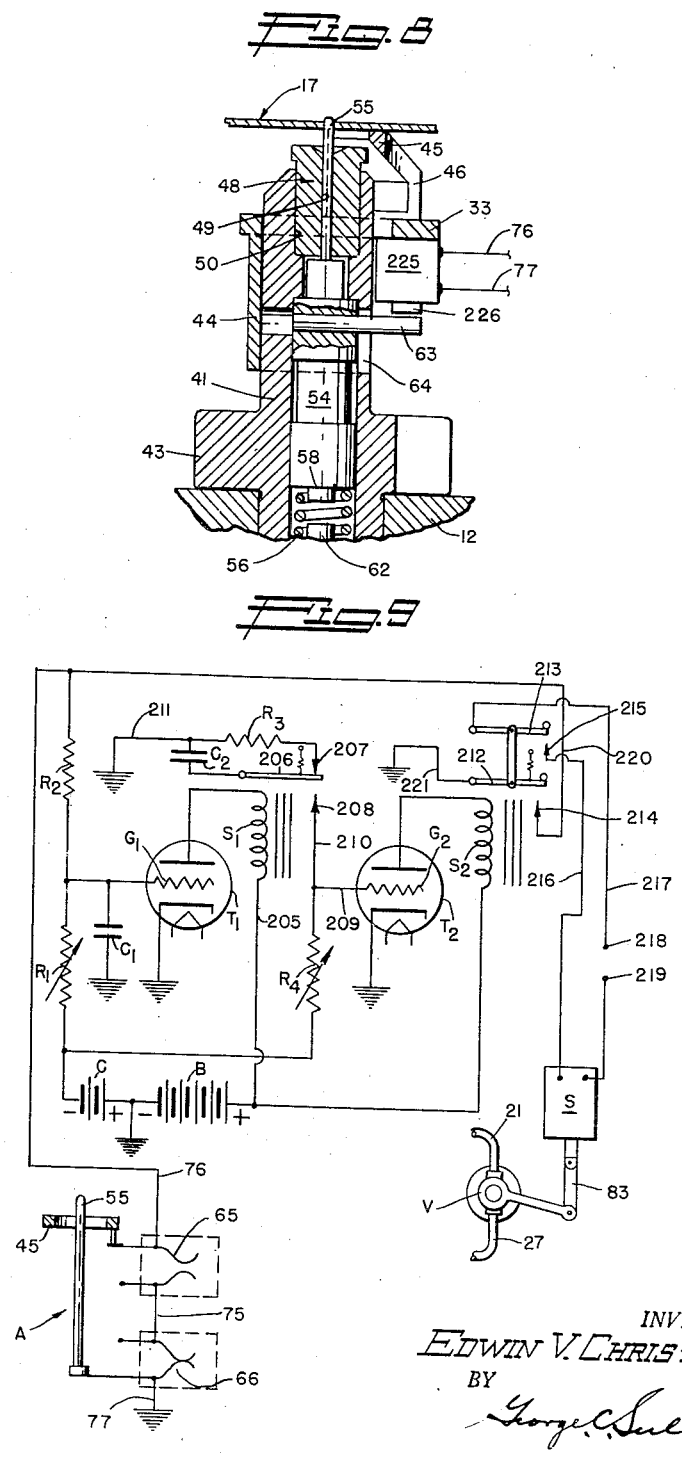

Patented Mar. 30, 1948

2,438,842

UNITED STATES PATENT OFFICE 2,438,842

AUTOMATIC DIMPLER

Edwin V. Christensen, Hollywood, Calif., assignor to Lockheed Aircraft Corporation, Burbank, Calif.

Application March 7, 1944, Serial No. 525,412

9 Claims. (Cl. 153—21)

This invention relates to automatic dimpling and riveting machines in general and more particularly to the automatic control of machines for countersinking rivet holes or bolt holes in pre-punched or drilled sheet metal in the manner commonly employed for flush riveting airplane skin panels.

This invention may be adapted to numerous uses but finds its principal application in automatic dimpling or countersinking tools wherein the weight of a properly positioned sheet metal skin panel initiates the dimpling action. The present invention is primarily directed to the form of dimpling tool embodying automatic actuation and control and suitable safety mechanism which allows actuation of the machine only when the pre-punched or drilled sheets have been located in precisely the correct position within the machine for the forming operation, preventing thereby inadvertent operation of the dimpler prior to proper location of the sheet, and also to prevent repetition of the dimpling operation at a single dimpling location.

Various forms of dimpling tools have been heretofore employed for use with either one shot or diaphragm types of rivet squeezers. As customarily operated, these dimplers have a foot-switch or an air valve to be manually actuated by the operator after he has located the hole in the sheet over a pilot pin in the dimpling die.

With such manual operation of the squeezer mechanism it is possible for the machine to be actuated prior to proper location of the work sheet in the machine or during the step of shifting the work sheet from one work position to another, and thus inadvertent operation of the machine often occurs accidentally, apparently due to momentary lapses of proper coordination of the operator, probably brought about by the fatigue associated with rapid operation. Such inadvertent operation of the machine usually results in serious damage to the work piece and at times injury to the operator.

It is accordingly an object of this invention to eliminate the usual manual controls employed for operation of the squeezer thereby reducing fatigue and giving the operator greater freedom of movement and facility of handling the work sheet applied to the dimpling machine. It is another object of this invention to furnish an automatic means to actuate the dimpling or squeezing tool when the work sheet is in the proper location. It is a further object to furnish a practical safety means to prevent inadvertent actuation of the machine while the work sheet is improperly located. It is a still further object of the present invention to provide automatic actuation of the machine of such character as will produce uniform work independent of the skill of the operator.

The objects are attained in general by an embodiment of the invention which includes an automatic, fool-proof, mechanism associated with the die and punch mechanism which renders the squeezer machine inoperative unless the work sheet is in its precisely correct position between the die and punch and which will then substantially automatically initiate the actuation of the punch largely by the weight of the work alone when the work sheet is so located.

The objects of this invention are also attained by novel electrical timing and control means associated with the before mentioned automatic die and punch mechanism.

These and other objects and features of novelty will become evident hereinafter in the description which, together with the following drawings, illustrate preferred embodiments of the invention.

Figure 1 is an elevation of a typical squeeze dimpler showing the general arrangement of the apparatus of this invention therein.

Figure 2 is an elevation of the dimpling head assembly as viewed on line 2—2 of Figure 1.

Figure 3 is a plan view of the dimpling head assembly as taken on line 3—3 of Figure 1 and Figure 2.

Figure 4 is a sectional elevation of the dimpling head taken on line 4—4 of Figure 2 and including a schematic representation of the associated electric control circuit.

Figures 5, 6 and 7 are fragmentary sectional elevations of the punch and the dimpling die head of Figure 4 at several stages of its operation.

Figure 8 is a fragmentary sectional elevation of an optional form of dimpling heads.

Figure 9 is a schematic wiring diagram of an alternative control and timing circuit.

Referring now to the drawings in which like reference numerals refer to corresponding parts throughout the several figures, the apparatus of the invention is as follows:

The apparatus of this invention as employed in connection with a conventional squeezer machine is shown in Figure 1, said machine comprising a yoke 10 having upper and lower jaws 11 and 12, and supported on a pedestal 13. On the upper jaw 11 is a diaphragm cylinder 14, the diaphragm piston of which is operatively connected through suitable linkages to the reciprocable punch holder 15. The automatic die holder head which comprises a principal part of the invention is supported in the lower jaw 12 of the squeezer yoke in operating position as shown at 16 directly beneath the said punch holder 15. In operation the pre-punched or drilled sheet is introduced into the machine between the punch and die set as shown at 17 in Figure 1.

Air under pressure from a suitable source is supplied to the diaphragm cylinder 14, by pipes 18 and 19, through a pilot operated control valve 20. The pilot valve 20 is adapted to be controlled by the variation of the pressure of air in pipe 21 by a solenoid operated air valve V as hereinafter more fully described.

The electric timing circuit is contained within a box 25 mounted on the squeezer pedestal 13; and the before mentioned solenoid controlled valve is housed in a box 26 which may be placed in any convenient location. Air under suitable pressure is supplied to the solenoid valve V in box 26, from a suitable source through pipe 27. The electric lead wires interconnecting the electric control circuit and the solenoid operated valve pass through a suitable shielded conduit as shown at 28. The electrical conductors from the electric control circuit in box 25 pass through a suitable shielded conduit 29 to a terminal box 30 into which the lead 31 containing conductors 76, 77 and 78 from the automatic head 16, makes a plug connection as shown at 32.

Referring now primarily to Figure 4, the body of the automatic dimpling head 16 comprises an upper cylindrical die holder portion 41, a lower cylindrical shank 42; joined by an intermediate circular supporting collar 43. The shank 42 is adapted to fit into the die holding recess in the lower jaw 12 of the squeeze dimpler, and be supported by collar 43, as best shown in Figures 1 and 2. The upper cylindrical surface of the die holder portion serves as a guide for reciprocably supporting a semi-cylindrical sleeve 44 which carries at the upper end a semi-circular chamfered cuff or ring member 45; which constitutes one of the trigger members for automatic actuation of the device as hereinafter more fully described. The cuff or ring member 45 has a cut away opening as best shown at 46 in Figure 2, which forms thereby at its lower edge, a bridging circular segmental element 33 through which is threaded an adjustable switch actuating screw 47.

The semi-cylindrical sleeve 44 is normally urged upward to the extended position shown in Figures 2 and 4, by springs 103 acting under compression between wings 100 extending laterally from the lower edge of the sleeve 44; and the bottom of the cylindrical recesses 101 in the supporting collar 43.

Stop screws 104 threaded into the body 41 and acting in longitudinal slots 105 in the sleeve 44, serve to limit the longitudinal movement of the sleeve.

A dimpling die 48 which has a small axial bore 49, is supported at the upper end of the die holder 41 in a cylindrical recess 50. Inward movement of the dimpling die 48 into the upper end of the holder 41 is limited by the annular shoulder 51. Within the coaxial bore 53 of the body of the die holder 41—42 is a reciprocable cylindrical plunger 54. The upper end of the plunger 54 carries an integrally formed pilot pin 55 which is of sufficient length to extend through the central bore 49 of the before mentioned dimple die to a point above the upper surface of the ring 45 when the plunger and the said ring are in their uppermost positions as shown in Figure 4. A coil spring 56 acting under compression between the lower end 58 of the plunger 54 and the upper shoulder 59 of a threaded adjusting screw 60, serves normally to maintain the plunger 54 in its extreme upper position with the upper end 61 of the pilot pin 55 extending out through the dimple die as shown in Figure 4 as just mentioned. An upper cylindrical extension 62 of the adjusting screw 60 serves as a guiding support for the coil spring 56 and also as a stop to limit the downward movement of the plunger 54.

A switch actuating pin 63 extends laterally from the intermediate portion of the plunger 54 through an axial slot 64 formed through the die holder body in which the pin 63 has freedom for limited longitudinal motion upon reciprocation of the plunger 54. Two micro-switches 65 and 66, separated a suitable distance apart, are fixed to the die holder body 41 on flat seats 67 and 68 thereon, by means of screws 69 and 70. These micro-switches may be of any one of several well known types and manufacture, such as, for example, the General Electric "Switchette," No. CR1070–C103E3. The actuating plungers for the micro-switches are shown at 72 and 73 with which the adjustable actuating screw 47 and the pin 63 are respectively adapted to contact as hereinafter more fully described in connection with the operation of the apparatus. Inward and outward motion of the micro-switch plungers serve to close and open the contact points therein to respectively complete and break the circuits therethrough.

The micro-switches 65 and 66 when employed as shown in Figure 4, are connected in series by means of a common interconnecting conductor 75. Three lead conductors 76, 77 and 78 are brought out from the micro-switches 65 and 66, and from the said common interconnecting conductor 75 respectively, which leads make connection with the actuator and the control circuit diagrammatically illustrated in connection with Figure 4.

In the schematic wiring diagram shown in Figure 4, $X_1$ is a double pole single throw magnetic relay which is normally maintained open by spring 80; $X_2$ is a single pole double throw magnetic time delay relay switch normally held in the position shown, by the spring 81; and $X_3$ is a single pole single throw magnetic relay normally held open by the spring 82. S is a solenoid adapted to actuate the air valve V through the interconnecting link 83. Terminals 84 and 85 leading to the circuit are provided for connection to a suitable current supply, preferably direct current such as a battery or a direct current generator.

The action of the electrical control circuits diagrammatically shown in connection with Figure 4 will be more fully described herein in connection with the operation of the invention which is as follows:

Upon first locating the pre-drilled sheet 17 to be dimpled in place between the dimpling punch 91 and the dimple die 48 of the tool, and allowing its weight first to rest upon both the end 61 of the pilot pin 55 and the upper surface of the ring member 45, the average sized sheet will ordinarily be supported by the pilot pin without deflection of the ring member 45, but both the said pilot pin 55 and the ring 45 may, with slight downward assisting pressure upon the sheet by the operator, be retracted to the positions shown in Figure 5 and the sleeve 44 carrying the ring 45 will then be depressed against the action of springs 103 bringing the end of adjusting screw 47 in contact with the actuating plunger 72 of the micro-switch 65. The plunger 55 will also be depressed against the action of spring 56 to the position shown in Figure 5, resulting in movement of the lateral pin 63 away from contact with the actuating plunger 73 of the micro-switch 66. Micro-switch 65 will thus be closed while at the same time micro-switch 66 will be opened. The circuit through the micro-switches which are connected in series with the conductors 76 and 77 will thus remain open, and since the middle conductor 78 leading from the common connection 75 between the micro-switches leads to an open contact point 86, no actuation of the circuit then takes place under these conditions. With the sheet 17 positioned in the tool and resting on the pilot pin end 61 and upon the ring trigger member 45 as before mentioned, the sheet may be supported there without actuation of the switches 65 and 66, but as soon as a pre-drilled hole 92 in the sheet 90 is adjusted into registration with the pilot pin 55, the said pilot pin immediately snaps up through the hole to the position shown in Figure 6 allowing the plunger 54 to rise, carrying the pin 63 up into contact with the micro-switch plunger 73 to close the contact of micro-switch 66, and allowing the sheet 17 to lower against the forming surface of the die 48 against the resistance of the ring trigger member 45. The screw 47 is thus brought into contact with the plunger 72 of the micro-switch 65. The sheet 17 is then in its precisely correct location for dimpling, as shown in Figure 6 and the series circuit through both the micro-switches 65 and 66 is then complete. The current can then flow from the current supply connected to terminal 85 through bus 105, lead-wire 76, micro-switch 65, interconnecting wire 75, micro-switch 66, lead-wire 77 and thence through conductor 106 through the electro-magnet 107 of the relay $X_2$ and from there through conductor 108 and return to terminal 84 through bus 109.

If desired, the spring 56 opposing the retraction of the pilot pin 55 may be adjusted for sufficient opposing force to support the weight of the work sheet 17 on its end 61 without retraction. Under this condition in operation, the work sheet is adjusted until a perforation registers with the pilot pin, at which time the sheet drops onto the ring 45 depressing it and actuating the switch 65.

Current also simultaneously flows from conductor 106 through the armature 110 of relay $X_2$ to contact 111 and thence through conductor 112, electro-magnet 113 of relay $X_1$ and through conductor 114 to bus 109. The electro-magnets of relays $X_1$ and $X_2$ are thus simultaneously energized and the interlinked armatures 115 and 116 of relay $X_1$ are immediately closed to contacts 117 and 118. The circuit from the power supply is thus initially completed between the busses 105 and 109 through the solenoid S by way of conductor 120, relay armature 116, contact 118 and connections 121 and 122.

Simultaneously upon energizing the solenoid S as just described, the electro-magnet 123 of relay $X_3$ is also energized from the power supply by way of bus 105, lead conductor 76, micro-switch 65, connection 75, micro-switch 66, lead connection 77, conductor 125, relay armature 115, contact point 117, and conductors 126 and 127 and return to bus 109. The armature 128 of relay $X_3$ is thus next closed to make contact at 129 thereby bridging or shunting the micro-switches 65 and 66 through conductors 130, 106 and 77, micro-switch 66, connection 75, micro-switch 65, and conductors 76 and 131 to armature 128 and return to contact 129.

Upon closing the circuit through the solenoid S as hereinbefore described, the valve V is actuated to admit low pressure air through pipe 21 to the pilot control valve 20 which in turn serves to admit high pressure air from pipe 18 through pipe 19 into the top end of the diaphragm of the diaphragm cylinder 14 which in turn, by means of suitable mechanism in the upper jaw of the squeezer yoke causes the dimple punch holder 15 carrying the punch 91, to be lowered into contact with the sheet 17 on the dimple die head to form a dimple.

Upon thus lowering the punch 91 upon the sheet in the dimple die to form the dimple in the sheet, the punch pilot pin 135 is brought into contact with the top end 61 of the pilot pin 55, forcing it together with the plunger 54 downward within the die holder 41 against the action of the coil spring 56 to the position shown in Figure 7. The lateral pin 63 is thus moved away from contact with the micro-switch plunger 73 and upon completion of that dimple the micro-switch 66 is then opened. However, since the micro-switches 65 and 66 are now bridged by means of the relay $X_3$, as before mentioned in connection with the operation of relay $X_3$, this opening of the micro-switch 66 will have no effect upon the circuit at this time.

Meanwhile, the armature 110 of the relay $X_2$ has been moving toward the contact 86 under the force of the energized electro-magnet 107 at a retarded speed as determined by the bellows 136. The contact point 111, being on a spring support, follows in contact with the armature 110 until contact is made with 86. This contact between armature 110 and contact 86, then bridges the micro-switch 66 by way of conductors 78 and 75, micro-switch 66, conductors 77 and 106, armature 110 and return to contact 86. The circuit through the electro-magnet 107 of the relay $X_2$ is thus perpetuated from bus 105 through line 76, micro-switch 65, connections 75 and 78, contact 86, armature 110, coil 107 and through connection 108 and return to bus 109.

Soon thereafter, by reason of the continued movement of the armature 110 against the retarding force of bellows 136, the contact between point 111 and the armature 110 opens, and the electro-magnet 113 of relay $X_1$ is then de-energized, in turn opening the contacts 117 and 118. The solenoid S is thus next de-energized, allowing the valve V to return to its closed position, moving the pilot valve 20 to exhaust the pressure from the top of the diaphragm and allowing the dimple punch 91 and punch holder 15 to return to their open positions as shown in Figure 1. The electro-magnet 123 of relay $X_3$ is also simultaneously de-energized upon opening of contact 117, in turn resulting in the opening of contact between the armature 128 and contact point 129.

The opening of contact between 128 and 129 removes the shunt across the micro-switches 65 and 66, but the time delay has been such that the micro-switch 66 has now been again closed by the upward return movement of pin 55 and plunger 54, and as long as the micro-switches 65 remain closed by the weight of the sheet 17 supported upon the ring 45, the electro-magnet 107 of the relay $X_2$ will remain energized by way of circuits 105, lead 76, micro-switch 65, connection 75, lead 78, contact 86, armature 110 and conductor 108 leading to bus 109.

Now upon opening of the micro-switch 65 effected by the removal of the weight of sheet 17 from bearing upon the ring 45, the circuit through the relay magnet 107 is opened and the armature 110 returns relatively slowly to its normal position and after a suitable period of time, as determined by the characteristics and adjustment of the bellows 136, opens the contact between the armature 110 and contact point 86. When the contact between the armature 110 and the contact point 111 has been reestablished by return of the armature 110 to its normal position, the electric control circuit and the squeezer mechanism is then ready for repetition of the operating cycle just described.

It will be obvious that the characteristics of this electrical control circuit are such that upon actuation of the squeezer in the formation of a dimple as shown at 101 in Figure 4, a reactuation of the dimpler cannot be immediately effected, but instead, there is a short delay period during which time movement of the pilot pin 55 and/or the ring member 45 will not re-energize the circuit to again set the squeezer in motion. A period of readjustment of the sheet to be dimpled is thus allowed, and after it is moved to a new position the squeezer cannot be again set into motion until the ring 45 has been depressed and precise registry of the sheet hole to be dimpled is made over the pilot pin 55 in position between the dimpling punch and die as shown in Figure 6.

Referring now primarily to Figure 9 in which an alternative electronic control circuit is diagrammatically illustrated, the principal components thereof are as follows: $T_1$ and $T_2$ are vacuum tubes which may be of substantially any of the well known suitable types. For example, a type 6N7 tube which is a twin triode containing the elements of the two tubes in one envelope, may be advantageously employed, although for convenience two separate tubes are herein illustrated. $S_1$ and $S_2$ are single pole double throw and double pole single throw magnetic relays respectively. $C_1$ and $C_2$ are condensers, and resistors of suitable values are shown at $R_1$, $R_2$, $R_3$ and $R_4$. The high voltage supply for the plates of the vacuum tubes is supplied from a suitable source of approximately 150 volt D. C. such as a battery B and a negative grid bias of approximately 5 volts is obtained from a suitable battery C. Suitable variation in these voltages may be made as is well known in the art.

In the electronic circuit the micro-switches 65 and 66 and the pilot pin 55 and ring 45 hereinbefore described in connection with Figure 4 are shown diagrammatically at A.

The operation of the automatic squeezer shown in Figure 4 in combination with the electronic control circuit of Figure 9, is as follows: When the squeezer is not in operation and the electronic circuit is quiescent, the vacuum tubes $T_1$ and $T_2$ are maintained non-conductive or at a low conductivity by reason of their grids $G_1$ and $G_2$ being biased to cut off or close to the cut-off potential by the C battery. Under this initial condition, condenser $C_1$ is charged to a voltage at or approximating the grid cut-off potential of tube $T_1$. Upon closing the micro-switch 65 as hereinbefore described, the charge on condenser $C_1$ is discharged through current limiting resistance $R_2$ and conductor 76, micro-switch 65, connection 75, micro-switch 66, and connection 77 to ground. Resistance $R_1$ being high in the neighborhood of 500,000 to 1,000,000 ohms, the battery C cannot restore or maintain the charge in condenser $C_1$ so long as this circuit to ground through the micro-switches is maintained. The grid $G_1$ is thus lowered to substantially cathode potential which immediately renders the tube $T_1$ sufficiently conductive to operate the relay $S_1$. The resultant current flow from battery B through the tube $T_1$ from cathode to anode and through the electro-magnet of the relay $S_1$ and return through conductor 205, moves the relay armature 206 into contact with point 208. The grid $G_2$ of vacuum tube $T_2$ is thus next connected through conductors 209 and 210 to the condenser $C_2$ which is initially at ground potential by reason of its having been previously bridged by resistance $R_3$ which is connected to ground at 211. The grid $G_2$ is thus also next momentarily reduced to substantially cathode potential which immediately renders tube $T_2$ sufficiently conductive to operate relay $S_2$. The values of the resistance $R_4$ and the capacity of $C_2$ are such as to prevent return of the grid to cut off potential for a suitable period of time. For example, a value of 750,000 ohms for $R_4$ and 0.5 microfarads for $C_2$ will result in a time constant of approximately 0.1 to 0.5 second for the timing circuit. The resultant flow from cathode to anode through the vacuum tube $T_2$ and through the electro-magnet of the relay $S_2$ causes the interlinked armatures 212 and 213 to be moved into contact with the points 214 and 215 respectively and held there for the period of time as determined by the before mentioned timing circuit. Upon thus closing the contact between armature 213 and contact 215, an electric circuit is completed through the solenoid S by way of conductors 216 and 217, whereby a current flows therethrough from a suitable source which may be connected at 218 and 219. The resultant actuation of the valve V through linkage 83 causes the dimpler punch 91 to be lowered into contact with the sheet to be dimpled on the dimpling die in the manner as hereinbefore described. The resultant contact of the punch pilot pin 135 upon the upper end 61 of the pilot pin 55 results in the opening of the micro-switch 66 as hereinbefore described. The opening of the micro-switch 66, however, does not immediately result in any action within the electronic circuit, for the reason that the before mentioned movement of the armature 212 into contact with the point 214 has shunted the micro-switches 65 and 66 by connecting the resistance $R_2$ and grid $G_1$ to ground through the conductor 220, armature 212, and conductor 221. This temporarily locks the vacuum tube $T_1$ in a conductive condition by maintaining its grid $G_1$ at ground and cathode potential.

After a period of time, the length of which, as before mentioned, is dependent upon the constant of the timing circuit comprising the variable resistance $R_4$ and the condenser $C_2$, which had been connected together through the relay armature 206 and contact point 208 and conductor 210, the potential of the grid $G_2$ in the tube $T_2$ will return to its cut-off value, whereupon this tube will be again rendered non-conductive. The resultant cessation of flow of current through the relay $S_2$ will in turn allow the armatures 212 and 213 to return to the initial positions shown in Figure 9, opening the circuits at contacts 214 and 215. The following resultant de-energization of the solenoid S will allow valve V to return to its normal position and the punch 91 to rise to its open position after having completed a dimple. As the dimple punch rises in the squeezer, the micro-switch 66 is again allowed to close momentarily due to the resultant rise of plungers 49 and 54, again bringing the grid of tube $T_1$ momentarily to ground potential following the opening of the lockout circuit contact 214. Thereafter after a period of time, determined by the constant of the timing circuit for the tube $T_1$ comprising the condenser $C_1$ and resistance $R_1$, the grid $G_1$ of $T_1$ will return to cut-off potential. The resultant cessation of current flow through the relay $S_1$ will allow the armature 206 to return to the position shown, re-establishing contact with point 207 and thereby discharging condenser $C_2$ to ground potential in readiness for the next operating cycle. The time constant of the circuit comprising $R_1$—$C_1$, is such that the brief time interval between the opening of contact 214 and the re-closing of micro-switch 66 is alone insufficient to return tube $T_1$ to its non-conductive condition.

It is obvious that, with the electronic circuit, as with the electric circuit hereinbefore described, a delay period is provided thereby, during which actuation of the micro-switches 65 and 66 by movement and adjustment of the sheet 17 and return of the dimpling punch after forming a dimple will not result in immediate repetition of the operating cycle. The time constant of the timing circuit $R_1$—$C_1$ and $R_4$—$C_2$ may be adjusted to suit the particular operating conditions obtaining by variation of either the resistances or the capacity of the condensers in the manner well known by those skilled in the art. However, adjustment of the constant of these timing circuits may be most conveniently made by employing variable resistances at $R_1$ and $R_4$.

Referring now to Figure 8, an optional version of the automatic die holder suitable for operation in conjunction with the electronic circuit of Figure 9 is shown. Here, instead of employing two micro-switches 65 and 66 which are fixed to the stationary body of the die holder, as shown in Figure 4, a single micro-switch 225 is employed which is attached to the flange portions 33 at the bottom of the cut-out of the ring 45 and is movable therewith. The laterally extending actuating pin 63 is located in the plunger 54 at a higher position than that shown in Figure 4, which will enable it, upon upward relative movement, to contact the micro-switch actuating plunger 226. Electrical connection through the micro-switch 225 is made through the before mentioned lead conductors 76 and 77. The action of the micro-switch 225 in the arrangement shown in Figure 8 is the same as that of the two micro-switches 65 and 66 shown in Figure 4. Thus, upon depression of the pilot pin 55, the plunger 54 will be lowered carrying with it the lateral pin 63 which will be moved further away from contact with the micro-switch actuating pin 226. The micro-switch 225 will thus remain open, with the electrical circuit remaining inoperative. If, thereafter, the pilot pin 55 is registered with a drilled hole in the sheet 99, and if sufficient sheet weight is placed upon the ring 45 to lower the micro-switch 225 together with the seat 33 upon which it is carried, to bring the micro-switch actuating plunger 226 into contact with the lateral pin 63, the electrical circuit between the conductors 76—77 will thus be completed and the electrical circuit actuated to initiate the dimpling cycle of operations, which occur as hereinbefore described in connection with the electronic circuit of Figure 9.

The present invention has for one of its advantages, the elimination of the foot pedal heretofore employed for either the initiation or the actuation of the dimpling tool. The elimination of the manual control of the dimpler has resulted in the removal of a source of fatigue for the operator. Heretofore the uniformity of dimples produced by the manual control were dependent largely upon the pressure exerted by the operator. Slow, light pressure on the foot pedal produced shallow poorly defined dimples, while fast, heavy pressure produced deep, sharply defined dimples. The production of perfectly formed dimples required an intense concentration, and such coordination of eyes, hands and feet as obviously resulted in sufficient nerve strain and fatigue to result in a substantially reduced rate of production with frequent mis-dimpling and damage to the sheet metal upon which the operations were being performed. Damage was often done to the die and punch by rough operation of unskilled operators.

In the apparatus of the present invention due to the fact that no manual coordination or operation is required and by reason of the fact that it is impossible to actuate the dimpler until the work sheet is precisely positioned on the pilot pin, anyone without previous experience can produce perfectly formed dimples. Also, positively and uniformly formed dimples will always be produced due to the uniform pressure obtained. While the present automatic control is illustrated for use with a dimpling tool, it is obvious that it may be employed in connection with any similar tool.

It is to be understood, therefore, that the foregoing is not to be limiting but may include any and all forms of methods and apparatus which are included within the scope of the claims.

I claim as my invention:

1. In combination with a tool for forming sheet metal, a trigger adjacent the forming portion of the tool and adapted to be actuated by contact with work material to be formed, a movable pilot member adjacent the forming portion of the tool and adapted to be retracted by improper contact with the material and to project upon registering with a reference element in the material to be formed, a power relay, a switching mechanism adjacent the forming portion of said tool, and means cooperatively associated with said trigger and pilot members to actuate said switching mechanism to cause said power relay to be actuated only when material is properly positioned with respect to said tool in contact with said trigger member and simultaneously in registration with said pilot member, and a time delay means associated with said power relay to limit the actuation of said tool to a single forming operation for each such proper position of the work material.

2. In combination with a tool for forming sheet metal, a trigger adjacent the forming portion of the tool and adapted to be actuated by contact with work material to be formed, a movable pilot member adjacent the forming portion of the tool and adapted to be actuated by contact with the material and to register with a reference element in the material to be formed, a pair of switches adjacent the forming portion of said tool, means associated with said trigger to close one of said switches and means associated with said pilot member to open the other of said switches, and control means actuated by said switches to cause power to be applied to said tool only when material is properly positioned with respect to said tool in contact with said trigger member and in registration with said pilot member.

3. In combination with a tool for forming sheet metal, a forming surface, a support for said forming surface, a movable trigger carried by said support and extending above the forming surface of said tool in a position to be contacted by sheet metal to be formed when placed on said tool in forming position, a retractable pilot member extending through said forming surface and adapted to be retracted by contact with sheet metal to be formed when said sheet metal is improperly positioned on the forming surface, and to register with and extend into an indexing deformation, in the sheet metal to be formed when said sheet metal is properly positioned on said forming surface, and a switching mechanism associated with said support adapted to be actuated by the combined movement of said pilot member and said trigger member.

4. Apparatus according to claim 3 and a power relay controlled by said switching mechanism to apply power to said tool only when material is properly positioned with respect to said tool in contact with said trigger member, and in registration with said pilot member.

5. Apparatus according to claim 2 and a time delay means associated with said control means to limit the actuation of said tool to a single forming operation for each position of the work material.

6. Apparatus in accordance with claim 2 and time delay means associated with said control means actuated by the said switches to limit the actuation of the tool to a single forming operation for each position of the work material, and means to reset the control means for the next forming operation upon movement of said work material to a new forming position in the tool.

7. In combination with a tool for dimpling preperforated sheet metal, a dimple forming surface, a support for said surface, a movable trigger carried by said support and extending above the forming surface of said tool in a position to be contacted by sheet metal to be dimpled when placed on said tool in dimpling position, a retractable pilot pin extending through the center of said dimple forming surface and adapted to be retracted by contact with sheet metal to be dimpled when said sheet metal is improperly positioned on the forming surface, and to extend through a perforation in the sheet metal to be dimpled when said sheet metal is properly positioned on said forming surface, and a switching mechanism associated with said support and adapted to be actuated by the combined movement of said pilot pin and said trigger member.

8. Apparatus in accordance with claim 7 and electric control means actuated by said switching mechanism to cause power to be applied to said tool only when the tool is properly positioned with respect to said tool in contact with said trigger member and in registration with said pilot pin.

9. A dimpling tool of the class described comprising a punch carrying a male dimpling surface and a projecting pilot pin, a die having a complementary dimpling surface, a central movable pilot pin projecting from said die and retractable upon contact with the pilot pin of said punch to permit closing of said punch and die during the dimpling operation, a retractable support for the material to be dimpled, said support being so associated with said die that in its extended position it makes contact with the work only when the die pilot pin either projects through a perforation in the material to be dimpled or is retracted by the pressure of the material resting thereagainst, yielding means adapted to normally project said die pilot pin, and switching mechanism adapted to be actuated by movement of said die pilot pin and said retractable support and adapted to complete an electrical circuit only when said die pilot pin is in its extended position and said support is in its retracted position.

EDWIN V. CHRISTENSEN.

REFERENCES CITED

The following references are of record in the file of this patent:

UNITED STATES PATENTS

| Number | Name | Date |
| --- | --- | --- |
| 1,233,699 | Peirce | July 17, 1917 |
| 2,017,865 | Morgan | Oct. 22, 1935 |
| 2,328,919 | Merriman | Sept. 7, 1943 |